US008522234B2

(12) United States Patent
Sareen et al.

(10) Patent No.: US 8,522,234 B2
(45) Date of Patent: Aug. 27, 2013

(54) TAILORING AN OPERATING SYSTEM TO A COMPUTER SYSTEM

(75) Inventors: Bhrighu Sareen, Redmond, WA (US); Zubair Ansari, Kirkland, WA (US); Mukesh Karki, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1597 days.

(21) Appl. No.: 11/702,310

(22) Filed: Feb. 5, 2007

(65) Prior Publication Data

US 2008/0189698 A1    Aug. 7, 2008

(51) Int. Cl.
*G06F 9/445*    (2006.01)

(52) U.S. Cl.
USPC ........................................................ 717/174

(58) Field of Classification Search
USPC ................................ 717/168–178
See application file for complete search history.

(56) References Cited

U.S. PATENT DOCUMENTS

| | | | | |
|---|---|---|---|---|
| 5,367,686 | A * | 11/1994 | Fisher et al. | 717/174 |
| 5,555,416 | A * | 9/1996 | Owens et al. | 717/178 |
| 6,351,850 | B1 * | 2/2002 | van Gilluwe et al. | 717/175 |
| 6,370,686 | B1 | 4/2002 | Delo et al. | |
| 6,378,128 | B1 * | 4/2002 | Edelstein et al. | 717/174 |
| 6,442,583 | B1 * | 8/2002 | Eilert et al. | 718/104 |
| 6,446,260 | B1 | 9/2002 | Wilde et al. | |
| 6,671,802 | B1 | 12/2003 | Ott | |
| 6,950,964 | B1 * | 9/2005 | McMichael et al. | 714/38 |
| 6,959,330 | B1 | 10/2005 | McIlroy | |
| 6,993,642 | B2 | 1/2006 | Burkhardt et al. | |
| 7,086,052 | B2 | 8/2006 | Mont et al. | |
| 7,120,786 | B2 | 10/2006 | Miller et al. | |
| 7,124,289 | B1 * | 10/2006 | Suorsa | 713/1 |
| 7,155,713 | B1 | 12/2006 | Burkhardt et al. | |
| 2002/0013895 | A1 * | 1/2002 | Kelley et al. | 713/1 |
| 2003/0195995 | A1 | 10/2003 | Tabbara | |
| 2005/0050539 | A1 * | 3/2005 | Burkhardt et al. | 717/174 |
| 2005/0071847 | A1 | 3/2005 | Bentley et al. | |
| 2005/0091348 | A1 | 4/2005 | Ferri et al. | |
| 2006/0005016 | A1 | 1/2006 | Lee et al. | |
| 2006/0010435 | A1 | 1/2006 | Jhanwar et al. | |
| 2006/0248534 | A1 * | 11/2006 | Chinn et al. | 718/104 |
| 2006/0259730 | A1 * | 11/2006 | Gimpl et al. | 711/173 |
| 2007/0220509 | A1 * | 9/2007 | Shwartz et al. | 717/174 |
| 2008/0168436 | A1 * | 7/2008 | Shwartz et al. | 717/174 |

FOREIGN PATENT DOCUMENTS

| | | |
|---|---|---|
| EP | 0474578 | 3/1992 |
| WO | WO-9604603 | 2/1996 |
| WO | WO0116701 A2 | 3/2001 |

OTHER PUBLICATIONS

Bokhari Shahid H., "The Linux Operating System", Date: 1995, http://ieeexplore.ieee.org/iel1/2/9058/00402081.pdf?isNumber=.

(Continued)

*Primary Examiner* — Anna Deng
(74) *Attorney, Agent, or Firm* — Wolfe-SBMC

(57) ABSTRACT

A method for tailoring the installation of an operating system to a computer system receives information regarding the computer system. Information regarding a modular operating system is accessed. The modular operating system is comprised of a foundational base and a plurality of installable features. Desired performance characteristics of the computer system are determined. Portions of the modular operating system are installed such that the modular operating system is tailored to the computer system and the desired performance characteristics of the computer system.

14 Claims, 7 Drawing Sheets

(56) References Cited

OTHER PUBLICATIONS

Chun, et al., "PlanetLab: An Overlay Testbed for BroadCoverage Services", Date: 2003, pp. 3-12, vol. 33, Issue: 3, ACM Press, New York, USA, http://delivery.acm.org/10.1145/960000/956995/p3-chun.pdf?key1=956995&key2=0984385611&coll=GUIDE&dl=portal,ACM&CFID=11111111&CFTOKEN=2222222.

Fulmer, et al., "AutoInstall for NT: Complete NT Installation Over the Network", https://www.usenix.org/publications/library/proceedings/lisa-nt98/full_papers/fulmer/fulmer.pdf.

International Search Report and Written Opinion Received for PCT Application No. PCT/US2008/053105, mailed on Jul. 14, 2008, 10 pages.

"Extended European Search Report", EP Application No. 08729095.3, (Apr. 8, 2010),8 pages.

"Foreign Office Action", EP Application No. 08729095.3, (Jun. 29, 2010),1 page.

Friedrich, L. F., "A Survey of Configurable, Component-Based Operating Systems for Embedded Applications", *IEEE Micro*, vol. 21, Issue 3, (May 2001),pp. 54-68.

"Foreign Notice of Allowance", Chinese Application No. 200880003977.1, (Mar. 1, 2012),4 pages.

"Foreign Office Action", Chinese Application No. 200880003977.1, (Feb. 10, 2011),6 pages.

Bokhari Shahid H., "The Linux Operating System", Date: 1995, http://ieeexplore.ieee.org/iel1/Feb.9058/00402081.pdf?isNumber=.

Chun, et al., "PlanetLab: An Overlay Testbed for BroadCoverage Services", Date: 2003, pp. 3-12, vol. 33, Issue: 3, ACM Press, New York, USA, http://delivery.acm.org/10.1145/960000/956995/p3-chun.pdf?key1=956995&key2=0984385611&coll=GUIDE&dl=portal, ACM&CFID=11111111&CFTOKEN=2222222.

Fulmer, et al., "AutoInstall for NT: Complete NT Installation Over the Network", https://www.usenix.org/publications/library/proceedings/lisa-M98/full_papers/fulmer/fulmer.pdf, Aug. 1998.

\* cited by examiner

300

RECEIVING INFORMATION REGARDING A COMPUTER SYSTEM.
310

ACCESSING INFORMATION REGARDING A MODULAR OPERATING SYSTEM.
320

DETERMINING DESIRED PERFORMANCE CHARACTERISTICS OF THE COMPUTER SYSTEM.
330

SELECTIVELY INSTALLING PORTIONS OF THE MODULAR OPERATING SYSTEM.
340

| FEATURE | COMPONENTS | DEPENDANT COMPONENTS | WEIGHT | PERFORMANCE | TARGET H/W |
|---|---|---|---|---|---|
| MEDIA VIEWER | T.V. DISPLAY CAPABILITY | DISPLAY DRIVER, USER INTERFACE | 0.9 | 80% | COMPUTER WITH T.V. VIEWING CAPABILITY |
| | T.V. RECORDING CAPABILITY | NONE | 0.6 | 44% | |
| | DVD WRITING CAPABILITY | NONE | 0.2 | 31% | |

400 — 410 FEATURE, 420 COMPONENTS, 430 DEPENDANT COMPONENTS, 440 WEIGHT, 450 PERFORMANCE, 460 TARGET H/W

FIG. 4

TAILORING AN OPERATING SYSTEM TO A COMPUTER SYSTEM

BACKGROUND

Typical operating systems for computer systems are designed as SKUs. Though the acronym "SKU" has the literal meaning of "shop keeping unit", in the business of operating system design, a SKU also refers to a particular version of an operating system that is designed for a particular category of computer systems. For example, one operating system may be designed for home personal computer systems, another may be designed for business computer systems, while yet another may be designed for server computer systems, while still another may be designed for hand-held computer systems.

Each SKU, or version of an operating system, has minimum computer system requirements to function properly once installed. These computer system requirements may be requirements such as a minimum amount of random access memory (RAM), a minimum amount of storage space, a minimum processor capability, or a minimum video card capability. If a minimum computer system capability is not met by the computer system, then the operating system may not be installable on the computer system, may function inefficiently, or may not be capable of performing some tasks which are installed as part of the operating system.

Typically an installer, such an end user or an OEM (original equipment manufacturer) buys an operating system SKU that contains features they desire, and then installs it. The installer then performs a basic check of the hardware to determine what peripherals and hardware components exist in the computer system, and then installs drivers needed for their support.

A disadvantage of the above described process is that the end user or OEM has the responsibility to make sure that, prior to installation, the operating system will fit on the target computer system and work well on the target computer system. Even if the computer system meets the minimum requirements such that the operating system may be installed and run, there is a chance that the computer system may have very poor performance.

Another technique that large OEMs utilize to avoid poor performance is manually optimizing an operating system for a particular computer system configuration. An image of this installation of the operating system is created, and then copied to identical computer system configurations that are manufactures. While this is a workable solution, it has several disadvantages. This solution is time consuming and costly, as a custom image must be built for each configuration of computer system that is manufactured. This solution also poses difficulties in managing and maintaining these images.

As can be seen, present methods and techniques for installing operating systems on computer systems suffer from several disadvantages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for tailoring an operating system to a computer system is disclosed. A method for tailoring the installation of an operating system to a computer system receives information regarding the computer system. Information regarding a modular operating system is accessed. The modular operating system is comprised of a foundational base and a plurality of installable features. Desired performance characteristics of the computer system are determined. Portions of the modular operating system are installed such that the modular operating system is tailored to the computer system and the desired performance characteristics of the computer system.

Such a tailored installation of a modular operating system facilitates using a single modular operating system to install an operating system of varied footprint on a variety of computer system platforms. This single operating system of varied footprint may be tailored in the manner described, to a variety of different computer systems ranging from low-cost computer systems and/or hand-held computer systems with minimum hardware capabilities all the way to high-end computer systems with specialty hardware components.

DESCRIPTION OF THE DRAWINGS

The accompanying drawings, which are incorporated in and form a part of this specification, illustrate embodiments of the technology for tailoring an operating system to a computer system and, together with the description, serve to explain principles discussed below:

FIG. 4 shows an example of a feature table, according to an embodiment of the present technology.

Figure 1:
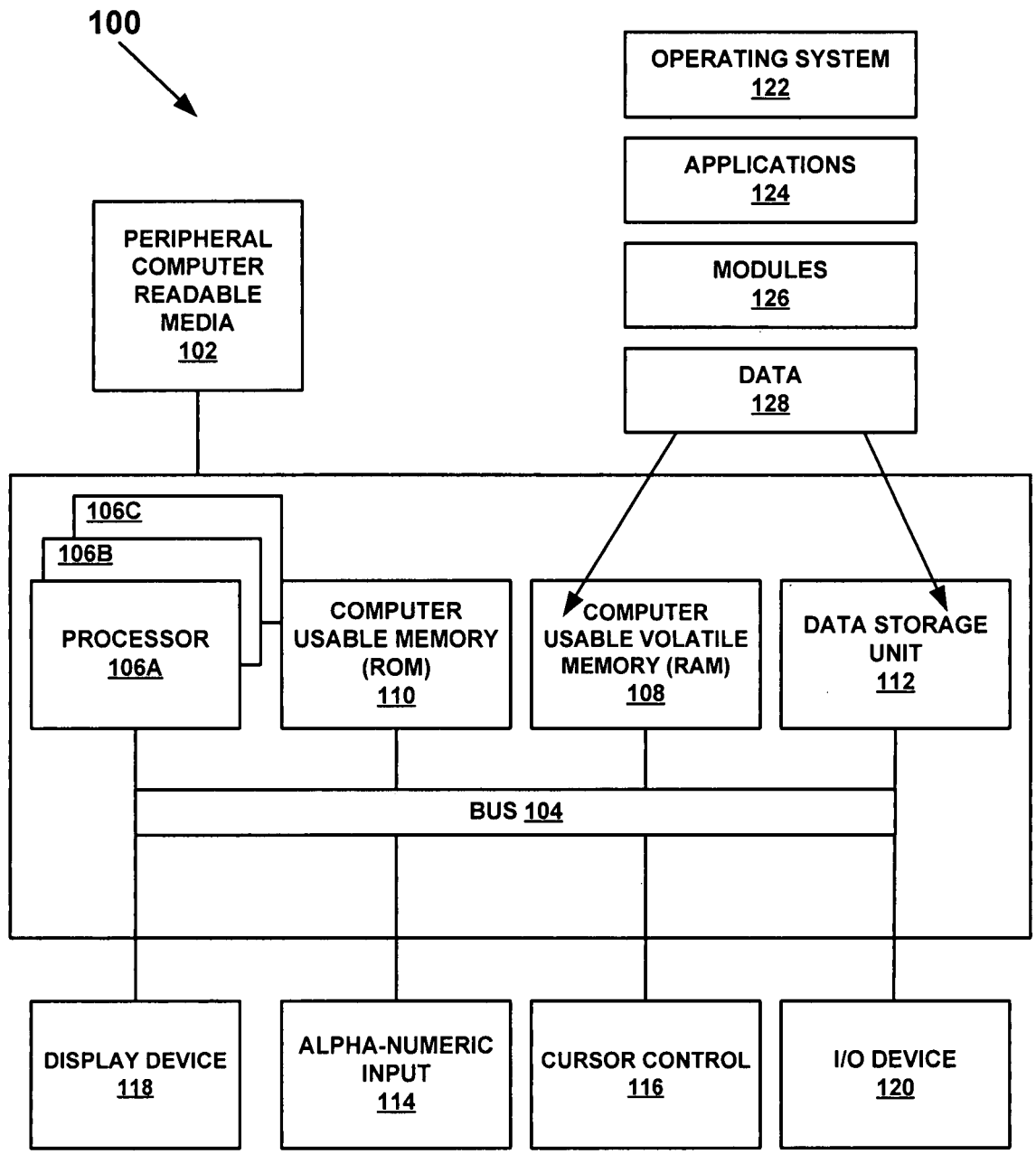
FIG. 1 is a diagram of an example computer system used in accordance with embodiments of the present technology for tailoring an operating system to a computer system.

The drawings referred to in this description should be understood as not being drawn to scale unless specifically noted.

DETAILED DESCRIPTION

Reference will now be made in detail to embodiments of the present technology for tailoring an operating system to a computer system, examples of which are illustrated in the accompanying drawings. While the technology for tailoring an operating system to a computer system will be described in conjunction with various embodiments, it will be understood that they are not intended to limit the present technology for tailoring an operating system to a computer system to these embodiments. On the contrary, the presented embodiments of the technology for tailoring an operating system to a computer system are intended to cover alternatives, modifications and equivalents, which may be included within the spirit and scope the various embodiments as defined by the appended claims. Furthermore, in the following detailed description, numerous specific details are set forth in order to provide a thorough understanding of embodiments of the present technology for tailoring an operating system to a computer system. However, embodiments of the present technology for tailoring an operating system to a computer system may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "accessing", "determining", "installing", "utilizing", "selecting", "associating", "performing", "generating", "comparing", "tailoring", "generating", "tie-breaking", "choosing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the present technology for tailoring an operating system to a computer system are also well suited to the use of other computer systems such as, for example, optical and virtual computers.

Overview of Discussion

Discussion will begin with a description of an example computer system environment with which, or upon which, embodiments of the present technology may operate. Discussion will proceed to a description of an example operating system tailorer which facilitates tailoring of an operating system for a computer system. Components of the operating system tailorer will be described. Operation of the operating system tailorer and its components will then be described in more detail in conjunction with a description of an example method for tailoring the installation of an operating system to a computer system, and also in conjunction with an example method for selecting a portion of an operating system to install on a computer system.

Example Computer System Environment

With reference now to FIG. 1, all or portions of some embodiments of the technology for tailoring an operating system to a computer system are composed of computer-readable and computer-executable instructions that reside, for example, in computer-usable media of a computer system. That is, FIG. 1 illustrates one example of a type of computer that can be used to implement embodiments, which are discussed below, of the present technology for tailoring an operating system to a computer system. FIG. 1 illustrates an example computer system 100 used in accordance with embodiments of the present technology for tailoring an operating system to a computer system. It is appreciated that system 100 of FIG. 1 is only an example and that embodiments of the present technology for tailoring an operating system to a computer system can operate on or within a number of different computer systems including general purpose networked computer systems, embedded computer systems, routers, switches, server devices, client devices, various intermediate devices/nodes, stand alone computer systems, media centers, handheld computer systems, low-cost computer systems, high-end computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. In embodiments of the present technology, operating system 122 is a modular operating system that is comprised of a foundational base and optional installable features which may be installed in whole or in part, depending upon the capabilities of a particular computer system and desired operation of the computer system. Specifically, when present, all or portions of operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive; and that further, operating system 122 may be accessed from a remote location via, for example, a coupling to the internet. In some embodiments, for example, all or part of the present technology for tailoring an operating system to a computer system is stored as an application 124 or module 126 in memory locations within RAM 108, media within data storage unit 112, and/or media of peripheral computer readable media 102. Likewise, in some embodiments, all or part of the present technology for tailoring operating systems may be stored at a separate location from computer 100 and accessed via, for example, a coupling to the internet.

Operating System Tailorer

Figure 2:
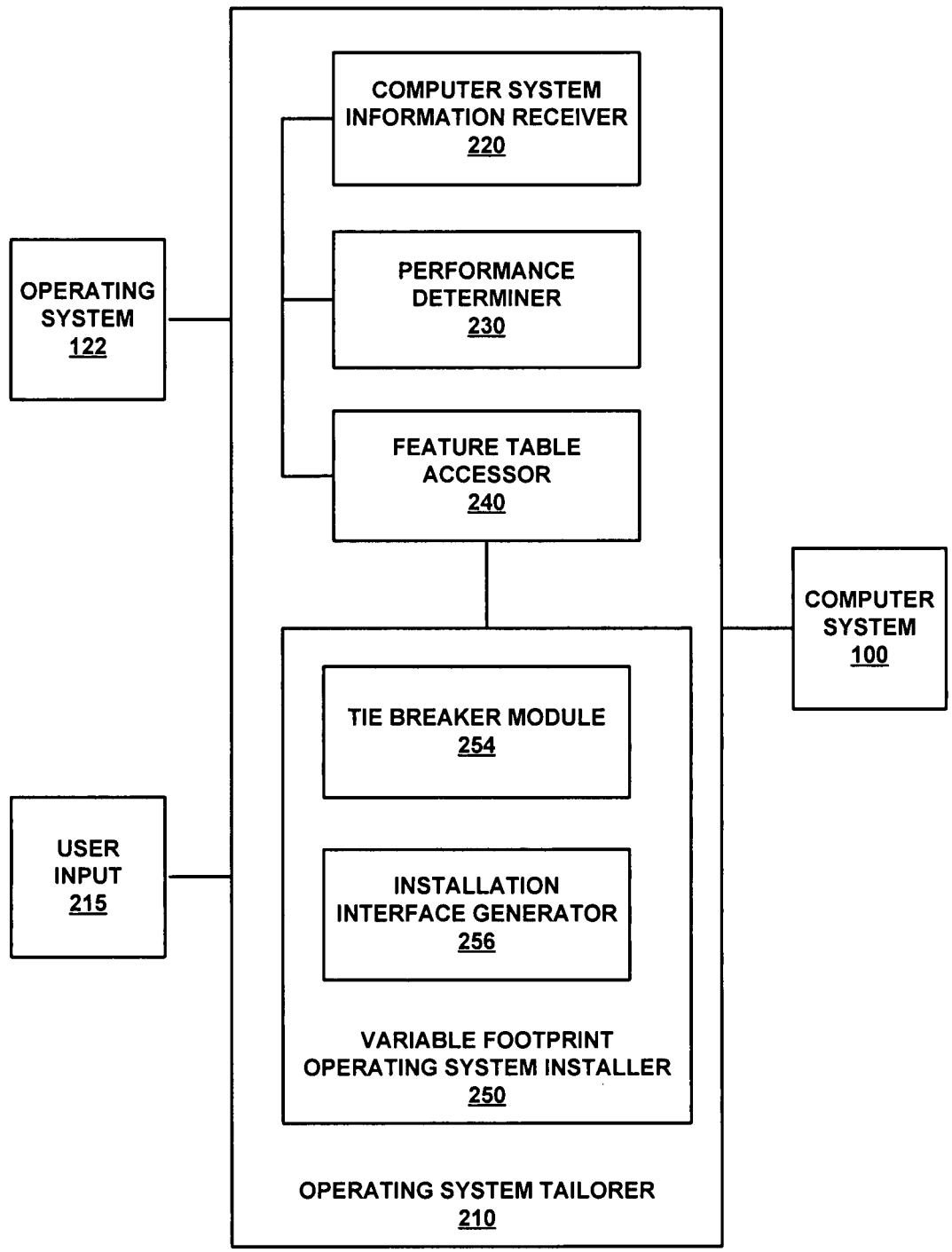
FIG. 2 shows an operating system tailorer, according to one embodiment of the present technology.

Referring now to FIG. 2, FIG. 2 shows an operating system tailorer 210 according to one embodiment of the present technology. Operating system tailorer 210 tailors an operating system to one or more specifications of a computer system and then, in one embodiment, installs the tailored operating system onto the computer system. As show in FIG. 2, operating system tailorer 210 is comprised of a computer system information receiver 220, a performance determiner 230, a feature table accessor 240, a variable footprint operating system installer 250, a coupling to a user input 215, a coupling to operating system 122, and a coupling to a computer system, such as, for example, computer system 100. Variable footprint operating system installer 250 is further comprised of a tie breaker module 254 and an installation interface generator 256.

For purposes clarity of description, functionality of each of the components in FIG. 2 is shown and described separately. However, it is appreciated that in some embodiments, inclusion of a component described herein may not be required. For example, in an embodiment where installation interface generator 256 is not utilized it may not be included in operating system tailorer 210. It is also appreciated that, in some embodiments, functionalities ascribed herein to separate components may be combined into fewer components or distributed among a greater number of components.

As shown in FIG. 2, computer system information receiver 220 is configured for receiving information regarding a computer system, such as, for example, computer system 100. The information regarding the computer system may be automatically received via a coupling, such an electronic coupling, to computer system 100. The information regarding the computer system may also be received manually by running some software on the computer system and feeding the results into information receiver 220. The information regarding the computer system may also be received from a user via coupling to user input 215, or via some other means such as scanning a SKU related to operating system 122 and then accessing a database related to operating system 122.

In one embodiment information regarding the computer system may comprise a hardware specification of computer system 100. For example, in one embodiment the information regarding the computer system is the storage capacity available on the computer system, such as the rated size of data storage unit 112 or the available free space on data storage unit 112. Such a hardware specification may also additionally or alternatively comprise one or more specifications including: available random access memory (RAM) 108, operating capabilities of a video card, operating capabilities of an audio card, and speed or other operating capability of a processor such as processor 106A. Information regarding the computer system may also include information regarding "expandability" of the computer system, such as information about the ability to add peripheral devices and hardware to the computer system at some future time.

As shown in FIG. 2, performance determiner 230 is coupled with computer system information receiver 220. Performance determiner 230 is configured for utilizing received computer system information to determine a performance level of a computer system, such as computer system 100, with respect to requirements of an installable feature of an operating system. The installable feature is one of a plurality of installable features of a modular operating system, such as operating system 122, that is comprised of a foundational base (which is installed on any computer system) and optional installable features which may be installed in whole or in part, depending upon the capabilities of a particular computer system and desired operational use of the computer system. In such a modular operating system, the foundational base comprises a set of features such as a kernel, a memory manager, a storage manager, an input/output manager, and the like. The features of the foundational base are typically required for functionality of even a stripped down computer system such as a low-cost computer system with minimal hardware capabilities or a hand-held computer system with minimal hardware capabilities. An available feature is one that is not necessary to the operating system, but rather, may facilitate the use of an option that a user may want or a more specialized use of a hardware or software component of the computer system.

In one embodiment, the computer system information used by performance determiner 230 is received from computer system information receiver 220. In one embodiment, for example, a single hardware specification, such a capacity of data storage unit 112, is used to determine the performance. For example, performance determiner 230 may subtract required storage space for a foundational base of the modular operating system to determine an initial performance capability of the computer system. From this initial performance capability, performance requirements of the installable feature, such as additional storage space required to install the installable feature, are further subtracted from the available storage space to determine the remaining free storage space on computer system 100. The resulting storage space which will be available after an install of the installable feature is utilized as the performance of the computer system with respect to the installable feature. This performance of the computer system is indicative of remaining operating performance capacity of the computer system, such as, in this example, remaining unused space on data storage unit 112.

In another embodiment, multiple hardware specifications may be combined together by performance determiner 230 to determine the performance of computer system with respect to an installable feature. In a similar manner to that previously described, an initial performance capability of the computer system is determined and then reduced accordingly by requirements of an installable feature to arrive at a performance capability of the computer system with respect to the installable feature.

Performance determiner 230 provides the performance level of the computer system with respect to the installable feature as an output. In one embodiment, this output is in the form of a numerical value, such as a percentage of the maximum rated performance of the computer system.

As shown in FIG. 2, feature table accessor 240 is coupled with performance determiner 230 to receive performance levels for one or more installable features. Feature table accessor 240 is configured for accessing entries of information which reside in a modular operating system feature table. Such accessing may comprise both reading and writing to such entries. In the modular operating system feature table, feature table accessor 240 associates a performance level with respect to an installable feature, with an entry for the installable feature. In one embodiment, this can comprise adding performance information to the feature table. In one embodiment, the entry for the installable feature also comprises a weighted importance of installation of a component of the installable feature. In one embodiment, feature table accessor 240 accesses a list of the installable features and their associated components (if any). In one embodiment, such a list of installable features and their components is created by the manufacturer of a modular operating system. In another embodiment, such a list of installable features and their components is derived from analysis of the installable features of a modular operating system such as operating system 100.

In one embodiment, entries related to installable features also comprise entry information indicating the weighted importance of installation of a component of an installable feature. This weighted importance represents the importance of that component to a user of the operating system. This may represent the weighted importance as compared to other components within the same installable feature. This may also represent the weighted importance as compared to components of other installable features. In one embodiment, the weighted importance entry information is predetermined by the manufacturer of the operating system. However, in one embodiment, this weighted importance may be adjusted by feature table accessor 240, for example, in accordance with user input from an original equipment manufacturer OEM or an end user which is received via the coupling to user input 215. With regard to component weights, a component that is required to be installed to facilitate a basic use or operation of an installable feature will typically have a higher weighted importance than a component which only provides some advanced use or operation that builds upon the basic use/operation of the installable feature. Furthermore, computer system resources consumed versus benefit of a component to a user may also be taken into account when the weighted importance of a component is determined and assigned.

As shown in FIG. 2, variable footprint operating system installer 250 is coupled with feature table accessor 240. Variable footprint operating system installer 250 is configured to tailor the operating system for the computer system on which the operating system is being installed. To perform this tailoring, variable footprint operating system installer 250 utilizes entry information in the modular operating system feature table to select installable features to include with a foundational base of the operating system. In one embodiment, variable footprint operating system installer 250 utilizes entry information such that weighted importance of a plurality of installable features selected for installation is maximized while maintaining a predetermined amount of operating performance capacity (colloquially known as headroom) on the computer system. In one embodiment, variable footprint operating system installer 250 selects the installable features such that a predetermined minimum operating performance capacity of the computer system is maintained after the installation of the foundational base of the operating system and any installable features. This may comprise selecting the installable feature(s) such that the weighted value of the component(s) selected to be installed with the installable feature(s) is maximized, while simultaneously maintaining the desired operating performance capacity of the computer system. Such maximization of the weighted value (either within an installable feature or across all the installable features of the operating system) illustrates how, in one embodiment, an operating system may be tailored to a computer system such features and components with the most importance to a user are installed while maintaining a predetermined operating performance capacity of the computer system.

With regard to a desired operating performance capacity of a computer system, such a desired operating performance capacity on a computer system may be predetermined by a user, OEM, or a manufacturer of the operating system. The operating performance capacity allows for a minimum amount of performance capacity of the computer system to be preserved. This operating performance capacity preserves sufficient performance capacity for the smooth operation of the installed operating system and any applications which may be run by the computer system. One example of operating performance capacity is adequate storage space to install applications and to allow the operating system and any installed applications to efficiently operate. Another example of operating performance capacity is sufficient RAM to allow the operating system and any installed applications to run efficiently. Yet another example of operating performance capacity is sufficient excess processor capacity to allow the operating system and any installed applications to run efficiently.

Ensuring adequate operating performance capacity improves the performance of the operating system, the computer system, and applications run upon the computer system. In one embodiment, the desired minimum remaining operating performance capacity may be expressed as a numerical value, such as a percentage of the rated performance capacity of the computer system. For example, in one embodiment, the desired minimum operating performance capacity remaining after installation of the foundational base and any installable features of a modular operating system may be 40% of the rated performance capacity of the computer system. For example, this may mean that it is desired for 40% of the maximum storage space of data storage unit 112 to remain free after installation of the foundational base and any installable features of a modular operating system.

To select an installable feature or portion thereof to install (for example one or more of a plurality of components of the installable feature), variable footprint operating system installer 250 utilizes entry information of one or more entries of the modular operating system feature table. For example, to select which component or components of an installable feature to install, variable footprint operating system installer 250 references the entry information regarding weighted importance of an installable feature and its components (if any) and entry information regarding performance for an installable feature and its components (if any). In one embodiment, variable footprint operating system installer 250 then selects the components of the installable feature that have the highest weighted importance, while maintaining computer system performance above the established minimum operating performance capacity.

Following the selection of installable features, in one embodiment, variable footprint operating system installer 250 then installs the selected installable features and components thereof (if any) on computer system 100 along with the foundational base of the operating system.

Figure 7:
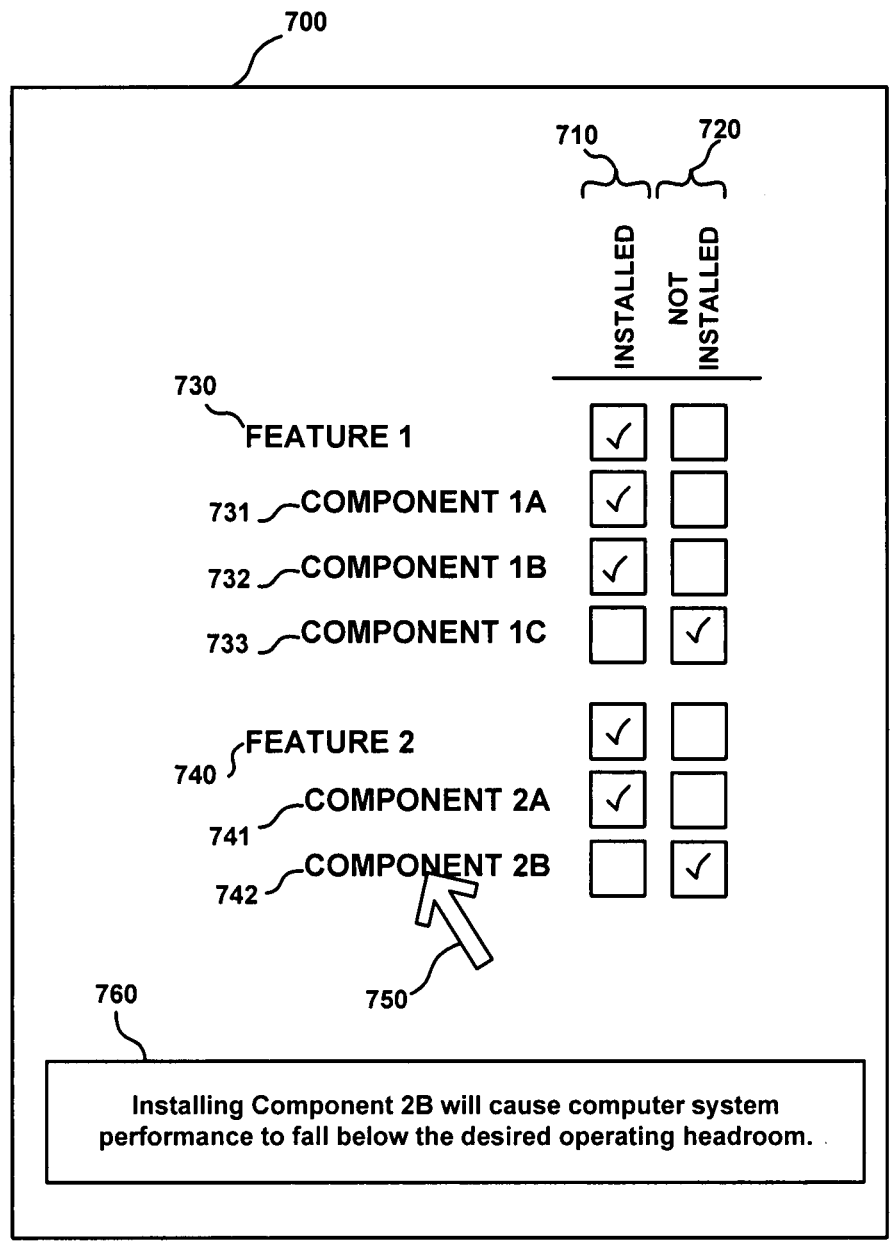
FIG. 7 is an example of an installation interface, according to an embodiment of the present technology.

In one embodiment, as shown in FIG. 2, variable footprint operating system installer 250 comprises an installation interface generator 256 configured for generating an installation interface which visibly indicates installed and uninstalled installable features (and components thereof) of the operating system. FIG. 7, which will be described herein, shows one example of such an installation interface.

In one embodiment, as shown in FIG. 2, variable footprint operating system installer 250 comprises a tie breaker module 254. Tie breaker module 254 is configured for choosing an installable feature to install in the event that a group of installable features are initially judged as equally installable based on entries in the feature table. Tie breaker module 254 is also configured for choosing a component of an installable feature to install in the event that a group of components of an installable feature are initially judged as equally installable based on entries in the feature table. When such a tie occurs, tie breaker module 254 performs a tie breaking action to select an installable feature or component thereof for installation on the target computer system.

In one embodiment, for example, tie breaker module 254 presents information about the tied installable features and/or components to a user, and then utilizes a user input, such as a user selection of one of the presented installable features and/or components, as a tie-breaker when a plurality of installable features is tied based on the analyzing of the information.

In another embodiment, tie breaker module 254 utilizes an heuristic associated with the computer system as a tie-breaker when a plurality of installable features and/or components is tied based on the analyzing of the information in the feature table. Assuming, for example, that a target computer system is being built for home use and two installable features are determined to be tied. In this example one tied installable feature is a server function of the operating system and the other tied installable feature facilitates media viewing on the computer system. Utilizing a heuristic, related to the knowledge that this computer system is being built for home use, tie-breaker module 254 will select the installable feature which facilitates media viewing. In this example, the heuristic approach to tie breaking presumes, as a rule of thumb, that a home computer system user would rather have the operating system configured to support a media viewing capability than a server functionality.

Example Methods of Operation

Figure 3:
FIG. 3 is an example flow diagram of operations performed in accordance with one embodiment of the present technology.
Figure 3:
Figure 3:
Figure 6:
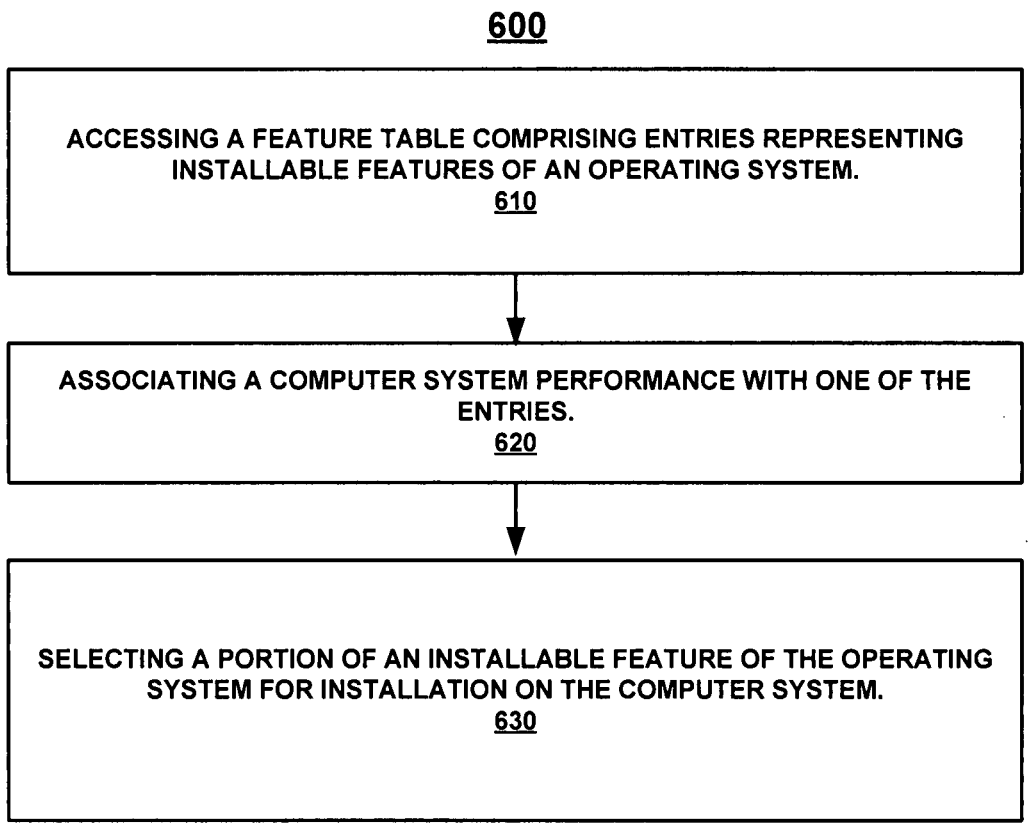
FIG. 6 is an example flow diagram of operations performed in accordance with one embodiment of the present technology.

The following discussion sets forth in detail the operation of some example methods of operation of embodiments of the present technology for tailoring an operating system to a computer system. With reference to FIG. 3 and FIG. 6, flow diagrams 300 and 600 each illustrate example steps used by various embodiments of the present technology for tailoring an operating system to a computer system. Flow diagrams 300 and 600 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, peripheral computer-readable media 102, and/or data storage unit 112 of FIG. 1. The computer-readable and computer-executable instructions, which may reside on computer useable media, are used to control or operate in conjunction with, for example, processor 106A and/or processors 106A, 106B, and 106C of FIG. 1. Although specific steps are disclosed in flow diagrams 300 and 600, such steps are examples. That is, embodiments are well suited to performing various other steps or variations of the steps recited in flow diagrams 300 and 600. It is appreciated that the steps in flow diagrams 300 and 600 may be performed in an order different than presented, and that not all of the steps in flow diagrams 300 and 600 may be performed.

Tailoring the Installation of an Operating System to a Computer System

FIG. 3 is a flow diagram 300 of operations performed in accordance with one embodiment of the present technology. More specifically, FIG. 3 illustrates a flow diagram 300 of an example embodiment of a method for tailoring the installation of an operating system to a computer system. Elements of flow diagram 300 are described below, with reference to elements of FIG. 2, FIG. 4, and FIG. 5.

At step 310 of flow diagram 300, in one embodiment, the method receives information regarding the computer system. In one embodiment, this comprises utilizing computer system information receiver 220 or like functionality to receive information related to a computer system on which an operating system is targeted for installation, such as, for example, computer system 100. This may comprise, for example, receiving a specification of one or more hardware components of the targeted computer system. In one example, this comprises receiving a rated performance capacity of a processor of the targeted computer system. In another example, this comprises receiving a rated storage capacity of a data storage unit of the targeted computer system.

Figure 5:
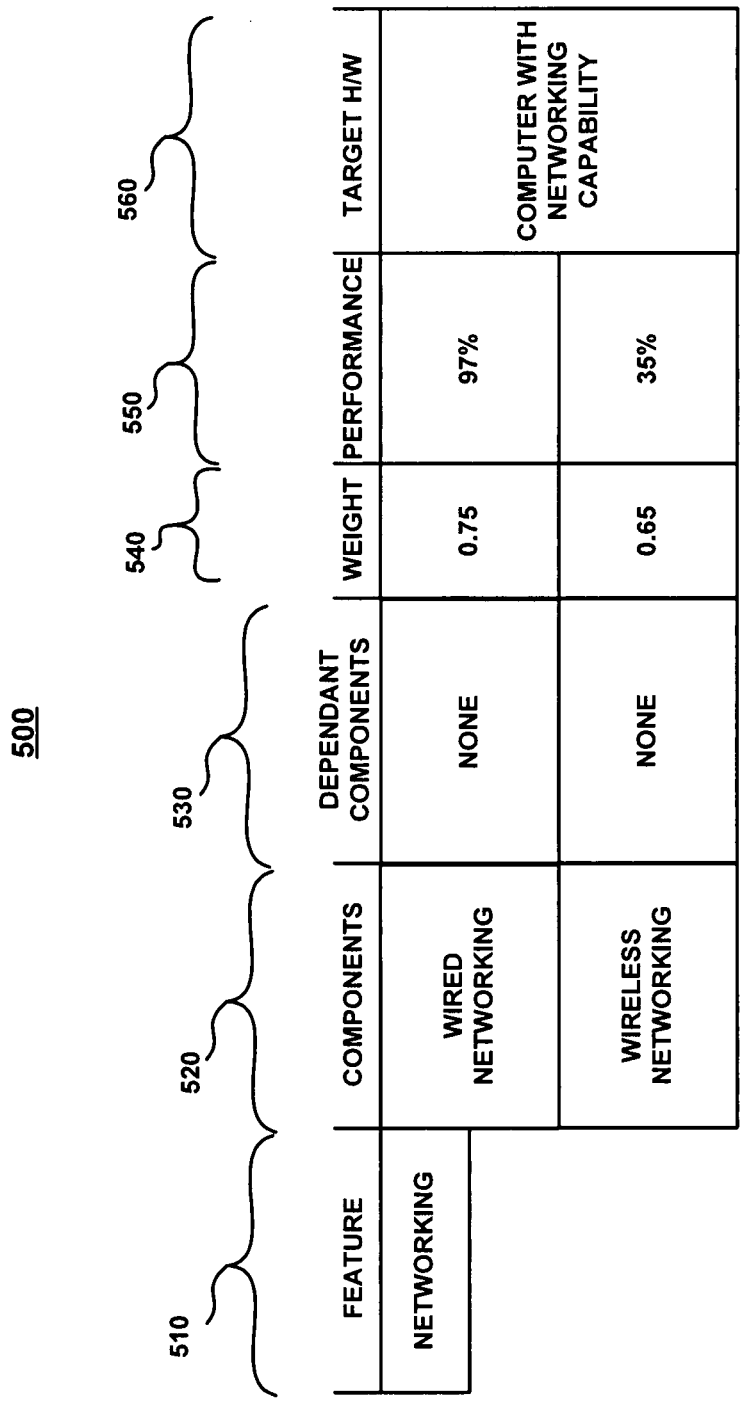
FIG. 5 shows another example of a feature table, according to an embodiment of the present technology.

At step 320 of flow diagram 300, in one embodiment, the method accesses information regarding a modular operating system. In one embodiment, this refers to accessing information regarding a modular operating system that is comprised of a foundational base and a plurality of installable features. In one embodiment, this comprises accessing a feature table comprising an entry related to an installable feature of the modular operating system. Feature table accessor 240 or like functionality may be used to perform the accessing of a feature table. Modular operating system feature table 400 of FIG. 4 is one example of such a feature table. Modular operating system feature table 500 of FIG. 5 is another example of such a feature table. It is appreciated that in one embodiment feature tables 400 and 500 are portions of an omnibus feature table representing a plurality of installable features of a modular operating system.

With reference to FIG. 4, modular operating system feature table 400 presents information about an installable media viewer feature of a modular operating system. While modular operating system feature table 400 is shown as a displayable table, it is appreciated that in some embodiments the displayed information may be a portion of a look up table, array, or the like, stored in data storage or the memory of a computer system.

As shown, in FIG. 4, modular operating system feature table 400 is comprised of six columns of information. Column 410 indicates the installable feature, a media viewer, to which entry information of modular operating system feature table 400 is related. Column 460 indicates the target hardware of the media viewer feature, namely a computer with television viewing capability (e.g., the computer system comprises a video card with equipped with a television tuner). Column 420 indicates that the media viewer feature is comprised of three installable components: television (IT) display capability, TV recording capability, and digital versatile disk (DVD) recording capability. Column 430 indicates the dependent components which are required to be installed along with a particular component of column 420. Column 430 shows that the TV display capability component of column 420 has two dependant components: a display driver and a user interface. Column 430 shows that the TV recording capability component of column 420 has no dependent components, and likewise that the DVD writing capability component of column 420 has no dependant components.

In FIG. 4, column 420 indicates the weighted importance of each component of the media viewer feature. The scale used runs from 0.0 to 1.0, with higher numbers indicating a greater importance. For example, the weighted importance of the TV display capability component is 0.9, the weighed importance of the TV recording capability component is 0.6, and the weighted importance of the DVD writing capability component is 0.2. As previously described, the weighted importance's shown in column 440 may be predetermined or user dictated. Column 450 indicates the performance of the computer system when a particular component of the media viewing feature is installed. For example, in one embodiment, the performances shown in column 450 are representative of remaining storage space on a data storage device, such as data storage device 112. Thus, in such an embodiment, if the TV display capability component is installed, 80% of the storage space will remain as operating performance capacity. Likewise, if the TV recording capability component is additionally installed, only 44% of the storage space will remain as operating performance capacity. Finally, if the DVD writing capability component is additionally installed, only 31% of the storage space will remain as operating performance capacity. It is appreciated that in one embodiment, numerical performance values shown in column 450 are provided by performance determiner 230.

With reference to FIG. 5, modular operating system feature table 500 presents information about an installable networking feature of a modular operating system. While modular operating system feature table 500 is shown as a displayable table, it is appreciated that in some embodiments the displayed information may be a portion of a look up table, array, or the like, stored in data storage or memory of a computer system.

As shown, in FIG. 5, modular operating system feature table 500 is comprised of six columns of information. Column 510 indicates the installable feature, networking, to which entry information of modular operating system feature table 500 is related. Column 560 indicates the target hardware of the networking feature, namely networking capability (e.g., the computer system comprises a network interface card or a similar networking component). Column 520 indicates that the networking feature is comprised of two installable components: wired networking and wireless networking. Column 530 indicates the dependent components which are required to be installed along with a particular component of column 520. Column 530 shows that the wired networking component of column 520 has no dependent components, and likewise that the wireless networking component of column 520 has no dependent components.

In FIG. 5, column 540 indicates the weighted importance of each component of the networking feature. The scale used runs from 0.0 to 1.0, with higher numbers indicating a greater importance. For example, the weighted importance of the wired networking component is 0.75, and the weighed importance of the wireless networking component is 0.65. As previously described, the weighted importance's shown in column 540 may be predetermined or user dictated. Column 550 indicates the performance of the computer system when a particular component of the networking feature is installed. For example, in one embodiment the performances shown in column 550 are representative of remaining storage space on a data storage device, such as data storage device 112. Thus, in such an embodiment, if the wired networking component is installed, 97% of the storage space will remain as operating performance capacity. Likewise, if the wireless networking component is additionally installed, only 35% of the storage space will remain as operating performance capacity. It is appreciated that in one embodiment, numerical performance values shown in column 550 are provided by performance determiner 230.

At step 330 of flow diagram 300, in one embodiment, the method determines desired performance characteristics of the computer system. Such performance determinations are performed using performance determiner 230 or like functionality. This can comprise determining a desired operating performance capacity of the computer system. The desired operating performance capacity can be the desired operating performance capacity of the whole system or the desired operating performance capacity of a subset of features and/or components of the computer system. This can also comprise determining a weighted performance characteristic of an installable feature of a modular operating system that is being installed. In some instances, for example, performance determiner 230 receives a user input of a desired amount of operating performance capacity for the target computer system that an operating system is being tailored for. In some embodiments, performance determiner 230 accesses operating system 122 to determine performance information such as desired operating performance capacity. In some embodiments, performance determiner 230 utilizes feature table accessor 240 to determine entry information related to a weighed performance characteristic of an installable feature of the modular operating system.

In one embodiment, determining desired performance characteristics of the computer system targeted for installation of an operating system comprises utilizing a performance requirement of the foundational base of the modular operating system in combination with received information regarding the computer system to determine an initial performance capability of the computer system. For instance, after installation of the foundational base, the operating performance capacity of a computer system may be reduced by a certain percentage, which will be reflected by the initial performance capability. The method then determines a performance of the computer system with respect to an installable feature of the modular operating system. This is done, in one embodiment, by reducing the initial performance capability with respect to a performance requirement of the installable feature of the modular operating system. Such a performance requirement may be determined on-the-fly by performance determiner 230 or accessed from a modular operating system feature table (for example, the performance information in column 450 of feature table 400). In one embodiment the method then, in a similar manner, determines the performance of the computer system with respect to a plurality of installable features of the modular operating system.

At step 340 of flow diagram 300, in one embodiment, the method selectively installs portions of the modular operating system. In one embodiment, this comprises selectively installing portions of the modular operating system such that the modular operating system is tailored to the computer system and the desired performance characteristics of the computer system. Such selective installation is performed using variable footprint operating system installer 250 or like functionality. In one embodiment, this comprises, selecting to install an installable feature based upon a weighted importance of the installable feature and an impact of the installable feature upon operating performance capacity of the computer system.

With reference to FIG. 2, FIG. 4, and FIG. 5, in an example where the desired operating performance capacity of target computer system 100 is 40% of the rated storage capacity of data storage unit 112 variable footprint operating system installer 250 will make trade-offs to perform the installation of modular operation system 122 on computer system 100. For example, in one embodiment, variable footprint operating system installer 250 will install the TV display capability component and the TV recording capability component of the media viewer feature, thus leaving operating performance capacity of 44%. In one embodiment, variable footprint operating system installer 250 will additionally install the wired networking component of the networking feature. This will cause the operating performance capacity to drop by 3% to 41%, thus maintaining the operating performance capacity above the desired level of 40%.

Selecting a Portion of an Operating System to Install on a Computer System

FIG. 6 is a flow diagram 600 of operations performed in accordance with one embodiment of the present technology. More specifically, FIG. 6 illustrates a flow diagram 600 of an example method for selecting a portion of an operating system to install on a computer system. Elements of flow diagram 600 are explained below, with reference to elements of FIG. 2, FIG. 4, FIG. 5, and FIG. 7.

At step 610 of flow diagram 600, in one embodiment, the method accesses a feature table comprising entries representing installable features of the operating system. In such an embodiment, the operating system is a modular operating system, such as operating system 122, comprised of a foundational base and a plurality of the installable features. In one embodiment, this comprises accessing a modular operating system feature table (such as, for example, table 400 or table 500) using feature table accessor 240 or like functionality. In one embodiment, this comprises accessing weighted importance entry information associated with one of the entries in the feature table. In one embodiment, the weighted performance information comprises a numerical representation of an importance to a user of the portion of an installable feature represented by the entry. Column 440 of FIG. 4 and column 540 of FIG. 5 provide examples of such numerical weighted performance information.

At step 620 of flow diagram 600, in one embodiment, the method associates a computer system performance with one of the entries in the feature table. This can comprise associating the computer system performance information with a component of the installable feature represented by the entry in the feature table. In one embodiment this comprises using performance determiner 230 (or like functionality) to determine the performance and utilizing feature table accessor 240 (or like functionality) to associate information related to computer system performance with the feature table. Column 450 of FIG. 4 and column 550 of FIG. 5 provide examples of such computer performance information associated with entries in a feature table.

At step 630 of flow diagram 600, in one embodiment, the method selects a portion of an installable feature of the operating system for installation on the computer system. This selection is based upon entry information of the feature table, and is made such that a predetermined amount of operating performance capacity is maintained on the computer system. In one embodiment, this selection of an installable feature is performed by variable footprint operating system installer 250 or like functionality.

In one embodiment, step 630 involves comparing weighted importance information related to a first component of the installable feature with weighted importance information related to a second component of the installable feature. With reference to FIG. 4, this would involve comparing the weighted importance information in column 440 of the TV display capability component (0.9) with the weighted importance information of the TV recording capability component (0.6). If a choice between the components needs to be made, the component with the higher weighted importance will be selected for installation.

In one embodiment, step 630 involves comparing weighted importance information related to the portion of the installable feature with weighted importance information of another installable feature. With reference to FIGS. 4 and 5, in one example, this would involve comparing the weighted importance information in column 440 of the TV display capability component (0.9) with the weighted importance information in column 540 of the wired networking component (0.75). If a choice between the components needs to be made, the component with the higher weighted importance will be selected for installation.

In one embodiment, step 630 involves determining whether installing the portion of the installable feature will cause the operating performance capacity of the computer system to drop below a predetermined minimum. By accessing information about performance of the target computer system, as related to the portion of the installable feature, variable footprint operating system installer 250 makes such a determination. For example, by accessing information in column 550 of FIG. 5, variable footprint operating system installer 250 can determine that the wired networking component may be installed without causing performance to drop below a desired operating performance capacity of, for example, 40%. However, if the wireless networking component is additionally installed the performance will drop to 35%, which is below the desired level of 40%.

In one embodiment, step 630 involves performing a tie breaking action to select the portion of the installable feature of the operating system for installation on the computer system. Tie breaker module 254 or like functionality is used to perform such tie breaking in the manner previously described in conjunction with tie breaker module 254.

In one embodiment, flow diagram 600 of FIG. 6 further comprises a step of generating an interface which visibly indicates installable features which have and have not been selected for installation. Installation interface generator 256 or like functionality is used to generate such an interface.

FIG. 7 is an example of an installation interface 700, generated according to an embodiment of the present technology. In one embodiment, installation interface 700 is generated by installation interface generator 256. Installation interface 700 is comprised of headings (730, 740) related to installable features and sub-headings (731, 732, 733, 741, 742) related to respective components of the installable features. For purposes of brevity and clarity, only a limited number of features and components are represented by installation interface 700. As shown in FIG. 7, columns of indicators (710, 720) in the form of check boxes are provided to indicate which installable features and/or components are installed (or selected for installation) and which installable features and/or components are not installed (or not selected for installation). Additionally a dialog box 760 is provided to display information about the listed features and components shown in installation interface 700. In one embodiment by selecting a component, such as via cursor 750, information about why the component of the installable feature has not been installed (or not selected for installation) is displayed in dialog box 760.

Thus, interface 700 visibly indicates installed installable features and non-installed installable features of a modular operating system.

Example embodiments of the present technology for tailoring an operating system to a computer system are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for tailoring an installation of an operating system to a computer system, said method comprising:
   receiving information regarding computer system hardware of said computer system, said information comprising at least available storage capacity;
   accessing a feature list comprising entries representing information regarding said operating system, wherein said operating system is a modular operating system comprised of a foundational base and a plurality of installable features;
   determining desired performance characteristics of said computer system based upon said information accessed from the feature list, wherein said desired performance characteristics of said computer system comprises a desired operating performance capacity of said computer system and a weighted importance characteristic of an installable feature of said modular operating system, wherein said weighted performance characteristic comprises a numerical representation of an importance to a user of an installable feature; and
   selectively installing portions of said modular operating system such that said modular operating system is tailored to said computer system and said desired performance characteristics of said computer system for said installation is maximized while maintaining a predetermined amount of operating capacity on said at least available storage capacity.

2. The computer-implemented method as recited in claim 1, wherein said receiving information regarding said computer system comprises:
   receiving a specification of one or more hardware components of said computer system.

3. The computer-implemented method as recited in claim 1, wherein said determining desired performance characteristics of said computer system comprises:
   utilizing a performance requirement of said foundational base of said modular operating system in combination with said information regarding said computer system to determine an initial performance capability of said computer system.

4. The computer implemented method as recited in claim 3, wherein said determining desired performance characteristics of said computer system further comprises:
   determining a performance of said computer system with respect to an installable feature of said modular operating system by reducing said initial performance capability with respect to a performance requirement of said installable feature of said modular operating system.

5. The computer-implemented method as recited in claim 4, further comprising:
   determining performance of said computer system with respect to a plurality of installable features of said modular operating system.

6. The computer-implemented method as recited in claim 1, wherein said selectively installing portions of said modular operating system by such that said modular operating system is tailored to said computer system and said desired performance characteristics of said computer system comprises:
   selecting to install an installable feature based upon a weighted importance of said installable feature and an impact of said installable feature upon said desired operating performance capacity of said computer system.

7. A computer-readable memory having computer-executable instructions for performing a method of selecting a portion of an operating system to install on a computer system, said instructions comprising:
   accessing a feature list comprising entries representing installable features of said operating system, wherein said operating system is a modular operating system comprised of a foundational base and a plurality of said installable features, wherein accessing the feature list comprise accessing weighted importance entry information associated said one of said entries, wherein said weighted performance information comprises a numerical representation of an importance to a user of said portion of an installable feature represented by said one of said entries;
   associating an anticipated computer system performance with said one of said entries representing installable features of said operating system; and
   selecting said portion of an installable feature of said operating system for installation on said computer system, said selecting based upon entry information of said feature list such that a predetermined amount of operating performance capacity is maintained on said computer system by determining whether installing said portion of said installable feature will cause an operating performance capacity of said computer system to drop below a predetermined minimum.

8. The computer-readable memory of claim 7, wherein said computer-executable instructions for performing the associating anticipated computer system performance information with said one of said entries further comprise computer executable instructions for:
   associating said anticipated computer system performance information with a component of said installable feature represented by said one entry of said entries.

9. The computer-readable memory of claim 7, wherein said computer-executable instructions for selecting a portion of an installable feature of said operating system for installation on said computer system further comprise computer executable instructions for:
   comparing weighted importance information related to a first component of said installable feature to weighted importance information related with a second component of said installable feature.

10. The computer-readable memory of claim 7, wherein said computer-executable instructions for selecting a portion of an installable feature of said operating system for installation on said computer system further comprise computer executable instructions for:
    comparing weighted importance information related to said portion of said installable feature with weighted importance information of another installable feature.

11. The computer-readable memory of claim 7, wherein said computer-executable instructions for selecting a portion of an installable feature of said operating system for installation on said computer system further comprise computer executable instructions for:

performing a tie breaking action to select said portion of said installable feature of said operating system for installation on said computer system.

12. A system including at least one processor, the system being configured to enable tailoring an operating system for a computer system, said system comprising:
- a computer system information receiver configured for receiving hardware information regarding said computer system;
- a performance determiner coupled with said computer system information receiver, said performance determiner configured for utilizing said hardware information to determine an anticipated performance level of said computer system with respect to requirements of an installable feature of said operating system, wherein said operating system is a modular operating system comprised of a foundational base and a plurality of said installable features;
- a feature list accessor coupled with said performance determiner, said feature list accessor configured for accessing entry information of a modular operating system feature list, said entry information related to computer system performance requirements and weighted importance of said installable feature, wherein said weighted performance comprises a numerical representation of an importance to a user of said installable feature; and
- a variable footprint operating system installer coupled with said feature list accessor, said variable footprint operating system installer configured to tailor said modular operating system for said computer system by utilizing said entry information such that weighted importance of a plurality of installable features selected for installation is maximized while maintaining a predetermined amount of operating capacity on said computer system.

13. The system of claim 12, wherein said variable footprint operating system installer further comprises:
- an installation interface generator configured for generating an interface which visibly indicates installed installable features and non-installed installable features of said modular operating system.

14. The system of claim 12, wherein said variable footprint operating system installer further comprises:
- a tie breaker module configured for choosing an installable feature to install in the event that a group of installable features is initially judged as equally installable based on said entry information in said feature list.

* * * * *